United States Patent [19]

Carl

[11] 4,322,290

[45] Mar. 30, 1982

[54] FILTER ASSEMBLY

[75] Inventor: John R. Carl, Orange, Calif.

[73] Assignee: Paul-Munroe Hydraulics, Inc., Orange, Calif.

[21] Appl. No.: 242,363

[22] Filed: Mar. 10, 1981

[51] Int. Cl.³ .................. B01D 27/10; B01D 35/14
[52] U.S. Cl. .................................. 210/133; 210/136; 210/232; 210/444
[58] Field of Search ............... 210/90, 130, 133, 136, 210/168, 232, 238, 418, 420, 443, 444

[56] References Cited

U.S. PATENT DOCUMENTS

| | | | |
|---|---|---|---|
| 2,431,782 | 12/1947 | Walton | 210/133 |
| 2,995,249 | 8/1961 | Boewe | 210/136 |
| 3,080,972 | 3/1963 | Smith | 210/136 |
| 3,238,085 | 2/1966 | Humbert | 210/136 |
| 3,400,821 | 9/1968 | Singleton | 210/136 |
| 3,485,371 | 12/1969 | Costantini | 210/136 |
| 3,715,032 | 2/1973 | Nicko | 210/133 |
| 3,777,889 | 12/1973 | Henderson | 210/136 |
| 3,912,046 | 10/1975 | Ferguson | 210/136 |
| 3,996,137 | 12/1976 | Cooper | 210/130 |
| 4,051,031 | 9/1977 | Suzuki | 210/136 |

FOREIGN PATENT DOCUMENTS 535234 7/1953 Canada .................. 210/130

Primary Examiner—Ernest G. Therkorn

[57] ABSTRACT

A filter assembly with an inner housing and filter element mounted within an outer housing, and with first and second poppets carried on a shaft in said inner housing forming first and second valves. The filter assembly has a normal flow path from the outer housing inlet through the filter element and into the inner housing past the first poppet valve and then out the outlets from the inner housing to the outer housing. A bypass flow path is provided through the filter assembly when the filter element is blocked or dirty. In the bypass operation, the increased pressure differential between inlet and outlet causes operation of the second poppet valve providing a flow path from inlet to outlet bypassing the filter element. A reverse flow path is also provided by the second poppet valve to prevent flushing of the filter during reverse flow conditions such as occur when the filter assembly is utilized in conjunction with a hydraulic motor.

7 Claims, 4 Drawing Figures

FILTER ASSEMBLY

BACKGROUND OF THE INVENTION

This invention relates to filter assemblies and, in particular, to a new and improved filter assembly of the type which can be used for filtering hydraulic fluid used in powering hydraulic motors and the like.

A typical filter assembly includes a filter element mounted in a housing which provides support and mechanical protection for the filter element and also provides a flow path from the housing inlet, through the filter element to the housing outlet. When such a filter assembly is utilized in conjunction with a hydraulic motor which may be operated in the reverse direction, there will be a reverse flow of fluid from the filter assembly outlet to the inlet. It is undesirable to have this reverse fluid flow through the filter element itself since this would tend to flush filtered particles off the element back into the fluid stream.

Also, during operation there comes a time when the filter element becomes blocked or dirty and its filtering action is reduced or terminated. While the filter element is no longer functioning, it is still desirable to have the fluid flow path open until the filter element can be replaced, and also to provide an indication that the filter element is no longer functioning. This is sometimes referred to as a bypass operation, with the fluid flow from the filter assembly inlet to the outlet bypassing the filter element.

It is an object of the present invention to provide a new and improved filter assembly providing for the normal fluid flow path through the filter element, and also providing for bypass operation around a blocked filter element and providing for reverse flow through the filter assembly without going through the filter element. It is another object of the invention to provide such a filter assembly in which the inlet and outlet of the main housing can be reversed permitting installation of the filter assembly without regard to a required direction of flow. Other objects, advantages, features and results will more fully appear in the course of the following description.

SUMMARY OF THE INVENTION

The preferred embodiment of the liquid filter assembly includes an outer housing with first inlet and outlet passages, an inner housing with second inlet and outlet passages, and a filter element, with the filter element and inner housing mounted within the outer housing and defining a normal liquid flow path from the first inlet passage to the filter element, the second inlet passage and second outlet passage to the first outlet passage. A first poppet is mounted in the inner housing providing a first valve between the second inlet and outlet passages, and a second poppet is mounted in the inner housing providing a second valve between the first inlet and outlet passages. The two poppets preferably are slightly mounted on a common shaft with a first spring between the two poppets and with a second spring between the second poppet and the outer housing, so that a high pressure at the outer housing inlet will serve to move the second poppet opening the second valve providing bypass flow from inlet to outlet around the filter element, and so that a high outlet pressure will also actuate the second poppet opening the second valve providing a reverse flow from outlet to inlet around the filter element.

DESCRIPTION OF THE PREFERRED EMBODIMENT

Figure 1:
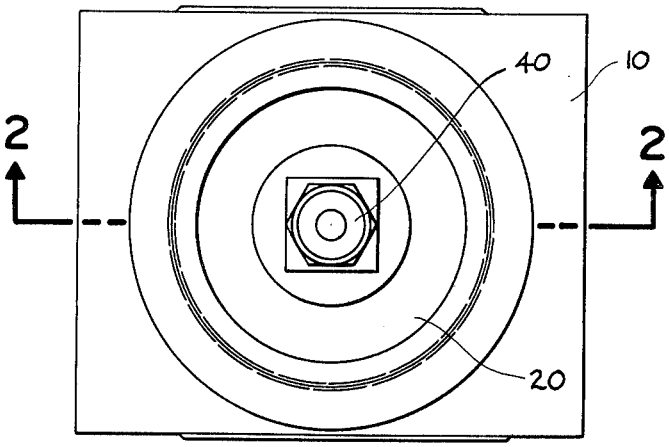
FIG. 1 is a top plan view of a filter assembly incorporating the presently preferred embodiment of the invention.
Figure 2:
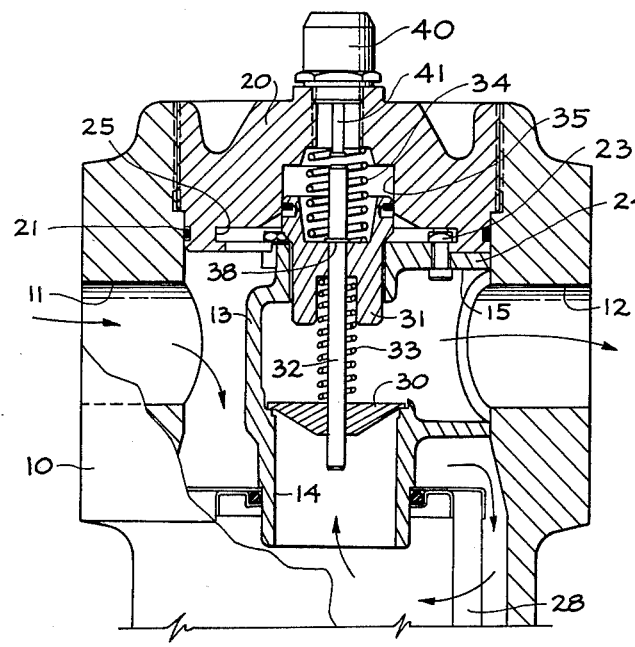
FIG. 2 is a sectional view taken along the line 2-2 of FIG. 1.

The filter assembly shown in the drawing includes an outer housing 10 having an inlet passage 11 and an outlet passage 12, and an inner housing 13 having an inlet passage 14 and an outlet passage 15. The housings 10, 13 typically are metal castings.

A plug is threadily inserted into the upper end of the housing 10, with an O ring seal 21 carried on the plug providing a sealing engagement with the housing 10. The inner housing 13 is mounted on the plug 20 by means of three bolts 23 which pass through a flange 24 of the housing 13, with the heads of the bolts positioned in an annular groove 25 of the plug 20.

A filter element 28 which may be a conventional unit, is positioned in the lower end of the outer housing 10, with the upper end of the filter element positioned about the inlet passage 14 of the inner housing 13. A clean-out plug 29 is provided at the lower end of the housing 10.

Figure 3:
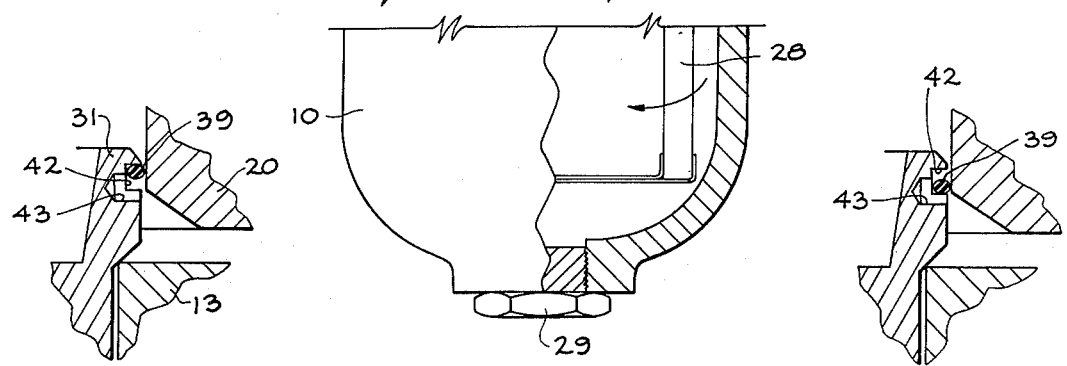
FIGS. 3 and 4 are enlarged sectional views of a portion of the filter assembly of FIG. 2, illustrating the sealing function.

Poppets 30, 31 are carried on a shaft 32 with a spring 33 there between. Another spring 34 is positioned about the shaft 32 above the poppet 31 in a chamber 35 of the plug 20. A snap ring 38 is carried in a groove in the shaft 32 above the poppet 31. Another annular groove 42 is provided in the poppet 31 near the upper end. One or more radial pasages 43 are also made in the poppet 31, positioned to communicate with the lower portion of the groove 42. An O ring seal 39 is carried in the annular groove 42. for sealing engagement with the plug 20, as best seen in FIG. 3. A conventional dirty filter indicator unit 40 is threadily inserted into the plug 20.

In operation, the fluid to be filtered is connected at the inlet passage 11, and the filter fluid is delivered at the outlet passage 12. The normal flow path through the filter assembly is shown by the arrows, with fluid entering at inlet passage 11, flowing into the interior of the outer housing 10 around th filter element 28. The fluid passes through the filter element which removes undesirable contaminants, with the filtered fluid flowing upward through the inner housing inlet passage 14, engaging the poppet 30 compressing the spring 33 permitting fluid flow into the interior of the inner housing 30 and out through the outlet passage 15 of the inner housing and outlet passage 12 of the outer housing.

When the filter element 28 becomes dirty or clogged, fluid flow therethrough will decrease and there will be an increase in pressure at the inlet passage 11 relative to that at the outlet passage 12. This pressure differential will increase until the inlet pressure acting on the poppet 31 is sufficient to move the poppet 31 upward against the force produced by the spring 34. This will unseat the poppet from the inner housing 13 permitting fluid flow from the inlet passage 11 into the interior of the inner housing 13 around the poppet 31 and out the outlet passages 15 and 12. This is sometimes referred to as a bypass flow path.

When the poppet 31 is moved upward, the shaft 32 is also moved upward due to engagement of the poppet 31 with the snap ring 38. The upward moving shaft 32 contacts a plunger 41 of the indicator 40, providing an external visual indication that filter element bypass flow has occured.

There are occasions when there may be reverse flow of fluid in the system in which the filter assembly is installed. Then the pressure at the outlet passage 12 increases. This will cause seating of the poppet 30 on the inner housing 13 preventing flow into the filter element 28. Also, there will be some fluid flow along the shaft 32 into the chamber 35. This increase in pressure in the chamber 35 causes collapse of th O ring 39, venting the chamber 35 to the inlet passage 11 and permitting upward movement of the poppet 31 because of the higher pressure at the outlet 12 than at the inlet 11. This permits the reverse fluid flow through outlet passages 12 and 15, around the raised poppet 31 and out the inlet passage 11. This reverse flow around the filter element, and the aforesaid bypass flow path when the filter element is clogged, are obtained with the same poppet and O ring configuration.

Figure 4:
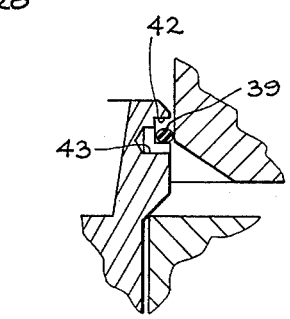

When the pressure on the O ring 39 is from below, the O ring is pressed upward into sealing engagement with the groove 42 and the plug 20, as shown in FIG. 3. When the pressure on the O ring 39 is from above, the O ring is pressed downward, providing a fluid flow path from the chamber 35 into the groove 42 and the vent passages 43 and then into the inlet passage 11, as shown in FIG. 4.

If desired, the normal direction of flow through the filter assembly is readily reversed. This is accomplished by removing the plug 20 with the inner housing 13 mounted thereon. Then the bolts 23 are loosened, the inner housing 13 is rotated 180° with respect to the plug 20, the bolts are tightened, and the plug is inserted into the outer housing 10. Then the passage 12 would be the inlet passage and the passage 11 would be the outlet passage. Otherwise, the operation will be described above.

The filter assembly of the invention is top loading, that is, the filter element 28 is inserted and removed through the top of the housing 10. This is much more convenient than bottom loading, and the weight and size of material to be handled when changing the filter element is considerably less.

I claim:

1. In a top loading filter assembly, the combination of:
    an outer housing having a space for receiving a filter element, with a drain plug at the bottom of said space, a top opening for insertion of said filter element into said filter element space, and a first inlet passage and a first outlet passage between said top opening and said filter space;
    an inner housing having a second inlet passage and a second outlet passage;
    a plug for mounting said inner housing within said outer housing above said filter element space and closing said top opening and defining a normal liquid flow path from said first inlet passage through said filter element, second inlet passage and second outlet passage to said first outlet passage;
    a first poppet mounted in said inner housing providing a first valve between said second inlet passage and second outlet passage, said first poppet including a first spring opposing flow from said second inlet passage to said second outlet passage; and
    a second poppet mounted in said inner housing providing a second valve between said first inlet passage and first outlet passage, said second poppet including a second spring opposing flow from said first outlet passage to said first inlet passage.

2. A filter assembly as defined in claim 1 wherein said inner housing is movable relative to said outer housing between a first position with said second outlet passage aligned with said first outlet passage, and a second position with said second outlet passage aligned with said first inlet passage.

3. A filter assembly as defined in claim 1 wherein said plug carries said inner housing, with said inner housing rotatable on said plug between a first position with said second outlet passage aligned with said first outlet passage, and a second position with said second outlet passage aligned with said first inlet passage.

4. A filter assembly as defined in claim 3 including an O ring seal carried in said second poppet in engagement with said plug and defining a chamber in said plug, with said second spring in said chamber, and with a leakage path along said shaft between said inner housing and said chamber.

5. A filter assembly as defined in claim 1 including a shaft with said first and second poppets slideable thereon,
    said first spring about said shaft between said poppets, and
    said second spring about said shaft between said second poppet and plug.

6. A filter assembly as defined in claim 5 wherein said second poppet has a first surface exposed to the fluid pressure within said inner housing and a second surface exposed to the fluid pressure within said outer housing.

7. A filter assembly as defined in claim 5 wherein said second poppet has an upper portion and a lower portion, with an annular groove in said upper portion, and with at least one radial vent passage communicating with the lower portion of said annular groove, and including an O ring seal carried in said annular groove.

* * * * *